(12) United States Patent
Covell et al.

(10) Patent No.: US 9,053,129 B1
(45) Date of Patent: Jun. 9, 2015

(54) CONTENT ITEM RELEVANCE BASED ON PRESENTATION DATA

(71) Applicant: Google Inc., Mountain View, CA (US)

(72) Inventors: Michele Covell, Palo Alto, CA (US); Shumeet Baluja, Leesburg, VA (US)

(73) Assignee: Google Inc., Mountain View, CA (US)

( * ) Notice: Subject to any disclaimer, the term of this patent is extended or adjusted under 35 U.S.C. 154(b) by 160 days.

(21) Appl. No.: 13/803,180

(22) Filed: Mar. 14, 2013

(51) Int. Cl.
*G06F 17/30* (2006.01)

(52) U.S. Cl.
CPC ...... *G06F 17/30286* (2013.01); *G06F 17/3089* (2013.01)

(58) Field of Classification Search
None
See application file for complete search history.

(56) References Cited

U.S. PATENT DOCUMENTS

| | | |
|---|---|---|
| 5,826,261 A | 10/1998 | Spencer |
| 5,960,383 A | 9/1999 | Fleischer |
| 6,006,222 A | 12/1999 | Culliss |
| 6,014,665 A | 1/2000 | Culliss |
| 6,029,195 A | 2/2000 | Herz |
| 6,035,294 A | 3/2000 | Fish |
| 6,078,916 A | 6/2000 | Culliss |
| 6,182,067 B1 | 1/2001 | Presnell et al. |
| 6,272,507 B1 | 8/2001 | Pirolli et al. |
| 6,285,999 B1 | 9/2001 | Page |
| 6,311,214 B1 | 10/2001 | Rhoads |
| 6,360,215 B1 | 3/2002 | Judd et al. |
| 6,405,175 B1 | 6/2002 | Ng |
| 6,473,752 B1 | 10/2002 | Fleming |
| 6,480,837 B1 | 11/2002 | Dutta |
| 6,732,088 B1 | 5/2004 | Glance |
| 7,062,561 B1 | 6/2006 | Reisman |
| 7,085,820 B1 | 8/2006 | Nickerson et al. |
| 8,001,118 B2 | 8/2011 | Dean et al. |
| 2002/0078045 A1 | 6/2002 | Dutta |
| 2011/0179023 A1 | 7/2011 | Dean et al. |
| 2011/0270672 A1* | 11/2011 | Hillard et al. ............ 705/14.42 |
| 2012/0150626 A1* | 6/2012 | Zhang et al. ............ 705/14.42 |
| 2012/0290637 A1 | 11/2012 | Perantatos et al. |

OTHER PUBLICATIONS

The Direct Hit Popularity Engine Technology a White Paper. [online] [retrieved on Apr. 2, 2009-04-02]. Retrieved from the Internet URL:http://www.uni-koblenz.de/FB4/Institues/ICV/AGKrause/Teachings/SS07/DirectHit.pdf. 5 pages.

* cited by examiner

*Primary Examiner* — Hung Q Pham
(74) *Attorney, Agent, or Firm* — Fish & Richardson P.C.

(57) ABSTRACT

Methods, systems, and apparatus for determining content item quality based on content item presentation data are presented. In one aspect, a method includes storing a first count of occurrences of a pair of content items being presented; storing a second count of second occurrences of a first content item of the pair being interacted with when it was presented in a lesser position in a resource relative to a second content item of the pair when the second content item of the pair was not interacted with; determining that the first count meets a first threshold; determining that a ratio of the second count to the first count meets a second threshold; and storing correlation data for the second content item based on the ratio.

20 Claims, 5 Drawing Sheets

CONTENT ITEM RELEVANCE BASED ON PRESENTATION DATA

BACKGROUND

This specification relates to information presentation.

The Internet provides access to a wide variety of resources, for example, webpages, images, audio files, and videos. Such access to these resources has likewise enabled opportunities for providing relevant additional content. One example of additional content is advertisements. For example, resources of particular interest to a user can be identified by a search engine in response to a user query. By comparing the user query to a list of keywords specified by a content sponsor, it is possible to provide relevant additional content to the user with search results.

Often, multiple content item providers compete to have their content items provided to users. For example, content sponsors may set bids for particular campaigns, and auctions may be conducted, where the content associated with the winning bidders is provided to users. The bids associated with content items may depend on various factors, and in some cases, one or more bids may be adjusted in order to provide the most relevant content items to users.

SUMMARY

This specification describes technologies relating to determining content item quality based on content item presentation data.

In general, one innovative aspect of the subject matter described in this specification can be embodied in methods that include the actions of determining first historical occurrences of two content items being presented together in association with a single resource; for one or more content item pairs, storing in a first data structure an entry that indicates a first count of the first historical occurrences of the pair; determining, for each content item pair, second historical occurrences of a first content item of the pair being interacted with when it was presented in a lesser position in a block of content items, wherein the lesser position is not a first position in the block of content items; for a given content item pair including the first content item of the pair and a second content item of the pair, storing in a second data structure a second count of a number of times in the second historical occurrences that the first content item was interacted with while in a less prominent position relative to the second content item of the pair while the second content item was not interacted with; determining entries in the first data structure where the first count exceeds a first threshold; for each determined entry, locating corresponding entries in the second data structure and determining if a ratio of the second count for the corresponding entry in the second data structure to the first count for the entry in the first data structure exceeds a predetermined second threshold; and when the ratio exceeds the predetermined second threshold, determining that a dichotomy exists and storing information about determined dichotomies. Other embodiments of this aspect include corresponding systems, apparatus, and computer programs, configured to perform the actions of the methods, encoded on computer storage devices.

These and other embodiments can each optionally include one or more of the following features. The two content items may be presented in response to a single request for content for presentation with the single resource. Also, the two content items may be presented in a same ad block of the resource. Occurrences of the first content item being interacted with may include occurrences of the first content item being clicked on.

Determining first historical occurrences may include evaluating a database that includes impression data for ads presented responsive to ad requests. In addition, determining second historical occurrences may include evaluating a database that includes click-through data after presentation of ads in an ad block.

The method may further include using the dichotomy information to select content to deliver to an entity.

The method may also include receiving a request for content; identifying plural candidates responsive to the request; determining a score for each candidate, including adjusting scores for candidates based on stored dichotomy information, if any; selecting a content item from the candidate content items based at least in part on the adjusted scores; and providing the selected content item responsive to the received request.

Determining a score for each candidate may include determining whether pairs of the candidates define a dichotomy based on the dichotomy information, and adjusting a score of at least one of the candidates in the pair based on a relative strength of the dichotomy.

The relative strength may be determined based on a ratio of second counts to first counts for a given pair.

In general, another aspect of the subject matter described in this specification can be embodied in methods that include the actions of determining first historical occurrences of a pair of content items being presented together in association with one or more resources; storing, in a first data structure, a first entry that indicates a first count of the first historical occurrences; determining second historical occurrences of a first content item of the pair being interacted with when it was presented in a lesser position in a resource relative to a second content item of the pair when the second content item of the pair was not interacted with; storing, in a second data structure, a second entry that indicates a second count of the second historical occurrences; determining that the first entry in the first data structure meets a first threshold; in response to the determination that the first entry in the first data structure meets the first threshold, determining that a ratio of the second count for the second entry in the second data structure to the first count for the first entry in the first data structure meets a second threshold; and in response to the determination that a ratio of the second count for the second entry in the second data structure to the first count for the first entry in the first data structure meets the second threshold, storing correlation data for the second content item, the correlation data being based on the ratio. Other embodiments of this aspect include corresponding systems, apparatus, and computer programs, configured to perform the actions of the methods, encoded on computer storage devices.

Particular embodiments of the subject matter described in this specification can be implemented so as to realize none, one or more of the following advantages. Identifying dichotomies helps a content server deliver more relevant content to users. Selectively adjusting bids or scores used to select content items may lead to a better return on investment for content item providers. Users, in turn, are provided with content items that are more likely to be of interest to the user.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A content management system facilitates the provision of content items, such as advertisements, to user devices. For example, a user device may request content items from a content management system, and in response, the system identifies relevant content items to provide to the user device. The systems and methods disclosed herein determine the relevance of content items based on, for example, historical performance of the content items and in particular relevance is determined based on co-presentation data and inferences derived therefrom (such as negative inferences when a content item is selected over another co-presented content item, particularly when the non-selected content item is positioned in a more prominent location).

Figure 1:
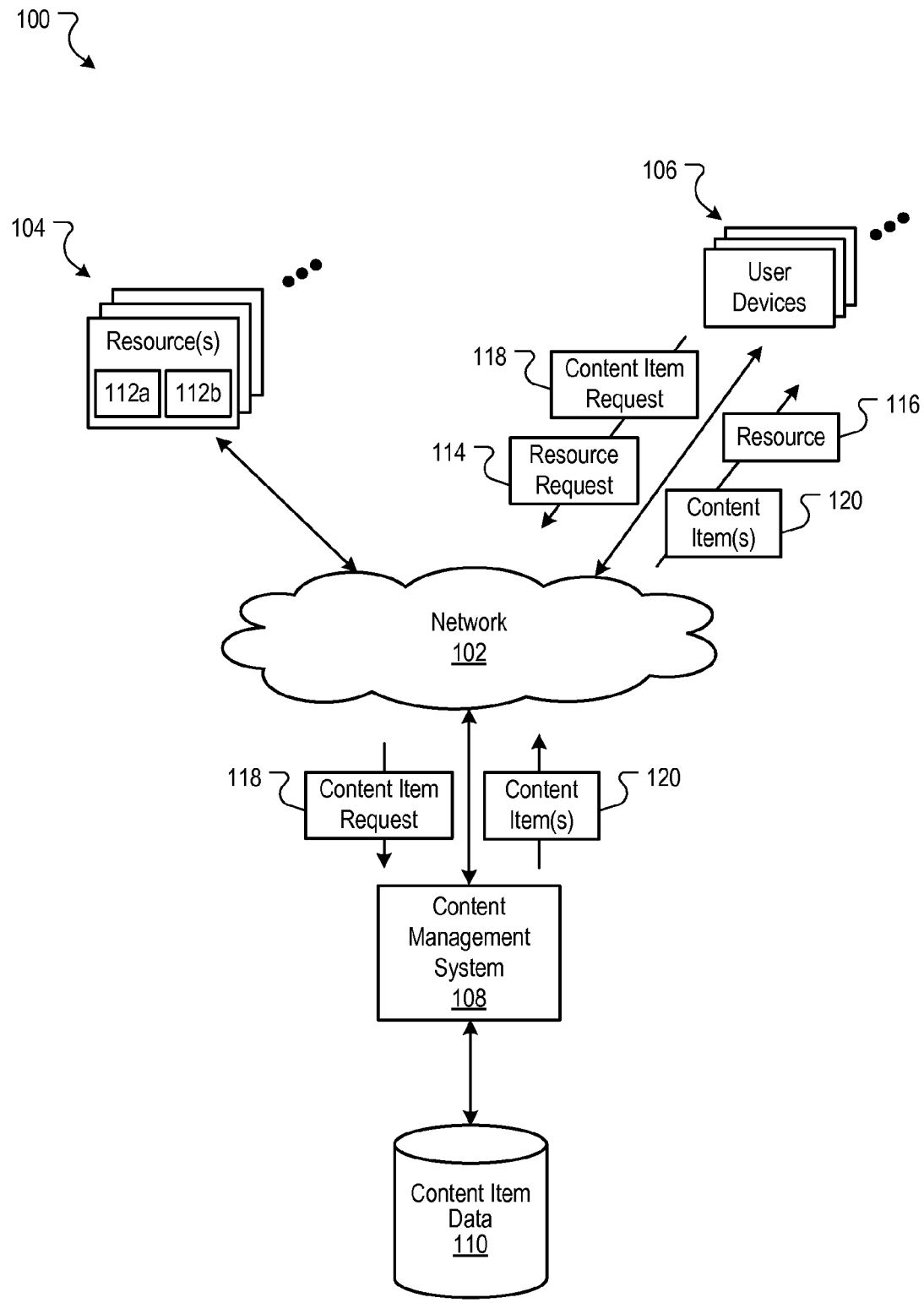
FIG. 1 is a block diagram of an example environment in which a content management system determines content item relevance.

FIG. 1 is a block diagram of an example environment 100 in which a content management system determines content item relevance based on content item presentation data. A computer network 102, such as a local area network (LAN), wide area network (WAN), the Internet, or a combination thereof, connects publisher resources 104, user devices 106, and the content management system 108. The example environment 100 also includes a content item data store 110, and may include many thousands of publisher resources 104 and user devices 106.

A resource 104 is any data that can be provided by a publisher over the network 102 and that is associated with a resource address. Resources 104 include HTML pages, word processing documents, and portable document format (PDF) documents, images, video, and feed sources, to name just a few. Resources may be associated with a website that is maintained by a content publisher and hosted by one or more servers. The resources 104 can include content, such as words, phrases, pictures, and so on, and may include embedded information (such as meta information and hyperlinks) and/or embedded instructions (such as scripts). The resources 104 may also contain content slots, such as content slots 112a and 112b, in which content items may be presented.

A user device 106 is an electronic device that is under the control of a user and is capable of requesting and receiving resources 104 over the network 102. Example user devices 106 include personal computers, mobile communication devices, and other devices that can send and receive data over the network 102. A user device 106 typically includes a user application, such as a web browser, to facilitate the sending and receiving of data over the network 102. The web browser can enable a user to display and interact with text, images, videos, music and other information typically located on a web page at a website on the World Wide Web or a local area network.

The content management system 108 facilitates the provisioning of content items, such as advertisements, with the resources 104. In particular, the content management system 108 allows content item providers to define selection rules that may take into account attributes associated with resources and or user devices to provide specific content items for users. Example selection rules include keyword-based criteria, in which content sponsors provide bids for keywords that are present in either search queries or resource content, and remarketing list based selection, in which content sponsors provide bids for sponsored content items that will be provided to user devices that have a device identifier that is associated with a remarketing list.

Content items can be provided for many different resources 104, such as the resources of the publishers and on a search results page resource. For example, a resource may include instructions that cause the user device to request content items from the content management system 108. The request may include, for example, a publisher identifier, a device identifier, and, optionally, keyword identifiers related to the content of the resource. The content management system 108, in turn, provides content items to the particular user device.

For example, the user device 106 may send a resource request 114, such as a search query, to a search engine. In response to receiving the search query, the search engine identifies resources in the form of search results and returns the search results to the user device 106 in search results page resource 116. In another example, the user device 106 may send a resource request 114 directly to a resource publisher. In response to receiving the resource request 114, the publisher provides the user device 106 with the requested resource 116. The search results page resource and/or requested resource may include instructions that cause the user device 106 to send a content item request 118 to the content management system 108. In response to receiving the content item request 118, the content management system 108 provides one or more content items 120 to the user device 106.

In some implementations, the content management system 108, in response to each request for content items, can conduct an auction to select content items to be provided in response to the request. The content items may be ranked according to a score that, in some implementations, is proportional to a value based on a content item bid and one or more parameters, such as those specified in the content item data 110. The highest ranked content items resulting from the auction can be selected and provided to the requesting user device for display in the content slot(s) of a resource. Other selection systems can be used including those that support a reservation model.

Factors affecting the rank of a content item may include, for example, a relevance score indicating a measure of relevance of a content item to the requesting user or user device and/or relevance to the resource with which the content item is to be presented. Historical performance is another factor that may be considered in a content item's ranking. An adjustment factor may also be used to adjust a score and/or rank associated with a content item. The adjustment factor may be based on, for example, content item dichotomies that exist between content items eligible for presentation. Content item dichotomies are discussed in further detail below.

The content management system 108 includes a data storage system that stores content item data 110. The content item data 110 may store information related to content items, such as the content items, selection information, remarketing information, and budgeting information for content item providers. For example, the content item data 110 may include historical data indicating which content items were presented with which resources, content slots occupied by previously presented content items, and selection data indicating which content item(s) was/were selected by a user. The content item data 110 may also include data indicating content item dichotomies which, as discussed in further detail below, relate to correlations between content items that are presented together.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that certain information about the user is removed. For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 2:
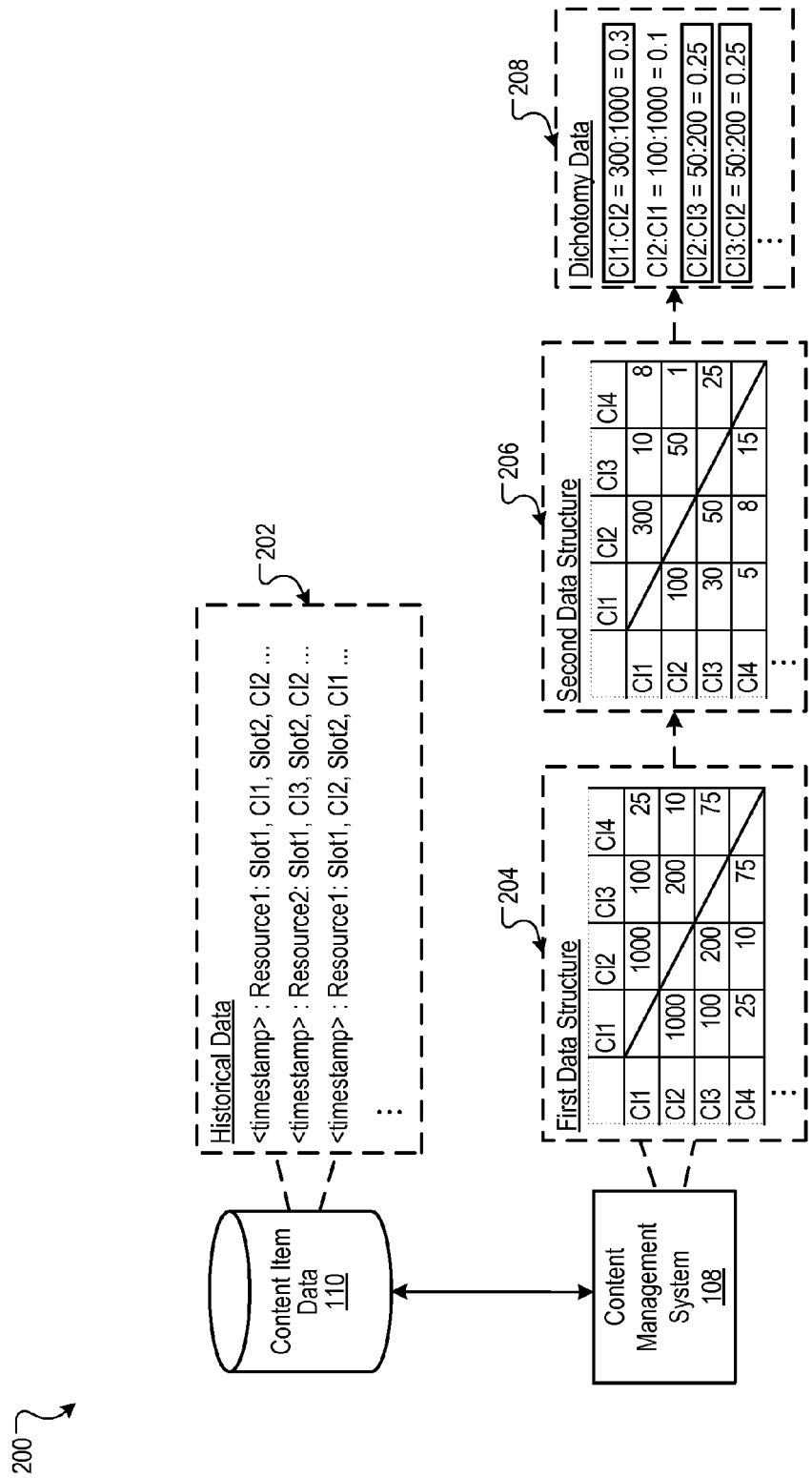
FIG. 2 is an illustration of an example data flow in which a content management system determines content item relevance.

FIG. 2 is an illustration of an example data flow 200 in which a content management system 108 determines content item relevance. The content management system 108 determines historical occurrences of two content items being presented together in association with a resource. In the example data flow 200, historical data 202 is included in the content item data 110 data store. The historical data includes, for example, records that specify information related to the presentation and selection of content items, such as the time of presentation, the resource with which the content item(s) was/were presented, other content items—if any, the position (e.g., ad slot/block) each content item was presented in, and which content items were interacted with (e.g., selected), if any.

For example, a content management system may identify historical occurrences of two advertisements being presented together on a web page. The historical data can specify which ad blocks and ad slots were occupied for each occurrence of the two advertisements being presented together. In addition, the historical data may indicate which advertisements were selected, if any.

The content management system 108 stores, in a first data structure 204, the number of times each pair of content items are co-presented together—e.g., for each pair of content items, the number of historical occurrences of both content items together. In the example data flow 200, the first data structure is a matrix, where each entry represents the number of times the corresponding pair of content items were presented together. For example, content item CI1 and content item CI2 were presented together 1,000 times, CI1 and CI3 were presented together 100 times, CI1 and CI4 were presented together 25 times, and so on. The example first data structure 204 is a matrix, but any suitable data structure or combination of data structures may be used for storing historical occurrences.

In some implementations, the number of occurrences stored in the first data structure is limited to the number of occurrences in which one of the two corresponding content items were selected. For example, if two advertisements were presented together on a web page, and neither were selected, the occurrence may not be counted in the first data structure. In some implementations, the co-presented content items are presented in response to a single request for content for presentation on the single resource. For example, a user device may send a single content item request to the content management system and receive multiple content items in response.

The content management system 108 determines historical occurrences of a content item being interacted with when it was presented in a lesser position of a content item block, or in a lesser content item block. For example, the content management system may determine, for a particular pair of content items, that a first content item was selected—e.g., clicked on by a user—100 times when the first content item was presented in a less prominent position than the second content item. A lesser position may be defined in any suitable manner, and may be different depending on a language or geographic location associated with the resource in which the content items are presented. For example, for countries and languages read top-to-bottom and left-to-right, content items on top may be more prominent than content items below, and content items on the left may be more prominent that content items on the right. The foregoing positional relationship is an example only, and any suitable positional relationship may be used to determine when one content item is presented in a more or less prominent position than another content item.

The content management system 108 stores, in a second data structure 206 and for each co-presented content item of a pair, the number of times a first content item of the pair was interacted with when it was presented in a lesser position relative to the second content item of the pair, and the second content item of the pair was not interacted with. For example, if a user device renders a web page with two ad slots—one on top of the other—and the user selects an advertisement presented in the bottom slot, the occurrence may be counted in the second data structure for the advertisement that was presented in the top slot. In other words, each count in the second data structure specifies an occurrence of the corresponding advertisement being presented in a higher position, but not interacted with.

In the example data flow 200, the second data structure 206 includes an entry of "300" that represents the number of times content item CI1 was presented more prominently than content item CT2, but not selected, when CT2 was selected. Conversely, the entry "100" represents the number of times CT2 was presented more prominently than CT1, but not selected, when CT1 was selected.

In some implementations, occurrences stored in the second data structure are determined by evaluating a database that includes click-through data after presentation of content items. For example, an advertisement database may store data that indicates which advertisements were presented in response to a particular request for advertisements, where the advertisements were presented on a web page, and which advertisements were clicked.

In some implementations, the data stored in the first and second data structures may indicate historical occurrences associated with individual device identifiers. For example, historical occurrences in the first and second data structures may have corresponding device identifiers that indicate the particular user devices that correspond to the historical occurrences.

Using the data in the first and second data structures, the content management system 108 determines whether a dichotomy exists between content items. An example of a dichotomy is a relationship between a pair of content items that indicates one content item is generally preferred over another when the pair is presented together with a resource.

In some implementations, the content management system 108 identifies entries in the first data structure that have a value that exceeds a first threshold. The first threshold is designed to ensure that enough data has been obtained regarding co-presented content items. By way of example, if the threshold was 150, only two content item pairs meet the first threshold—e.g., CI1:CI2 and CI2:CI3. In some implementations, the threshold is based on a percentage of presentation opportunities and is not just a fixed number.

The content management system 108 determines, for one content item of a pair of content items, whether a ratio of the content item's corresponding value in the second data structure to the corresponding value in the first data structure meets a second threshold. An example threshold may be 1:5, which could also be represented as a decimal, e.g., 0.2, or a percent, e.g., 20%. The threshold is designed to ensure that a correlation between content items is strong enough to be considered a dichotomy. For example, the ratio for CI1 with respect to CI2 is 300:1000, e.g., 3:10, 0.3, or 30%. The ratio for CI2 with respect to CI1 is 100:1000, e.g., 1:10, 0.1, or 10%. This indicates that, when CI1 is co-presented more prominently than CI2, 30% of the time CI2 is interacted with while CI1 is not interacted with. Because 0.3 exceeds the 0.2 threshold, the content management system determines that a dichotomy exists for CI1 when co-presented with CI2. On the other hand, when CI2 is co-presented more prominently than CI1, CI1 is only interacted with 10% of the time when CI2 is not interacted with. Because this is below the 0.2 threshold, no dichotomy is determined for CI2 when co-presented with CI1.

The example dichotomies described above are negative dichotomies, because, for a particular content item, a dichotomy according to the above description is determined when another co-presented content item is preferred. In some implementations, the content management system may determine and store data that indicates positive dichotomies. For example, if a particular content item is often preferred over another co-presented content item, data indicating the same may be stored and used in the same manner as negative dichotomies. In some implementations, the preference or selection of a particular content item over another co-presented content item is only tracked if the co-presented content item was presented more prominently than the particular content item. Such an implementation reduces impact of positional bias, e.g., a general tendency of content items presented in more prominent positions being selected more often than content items in a less prominent position, in determining positive dichotomies.

In some implementations, dichotomies are determined on an individual user device basis. For example, historical occurrences for a particular user may indicate content item preferences that are different from the collective preference of multiple user devices. In these situations, an individual user device dichotomy may provide a better indication the individual user device's preference, leading to selection of content items more likely to satisfy the informational needs of the user of the particular user device.

Once dichotomies are determined, the content management system 108 stores information about the determined dichotomies—e.g., in the content item data 110 as dichotomy data 208. In the example environment 200, the dichotomy data 208 indicates that a CI1:CI2 dichotomy exists. The dichotomy data 208 also indicates the ratio—in the example environment 200 this is displayed as a decimal. The ratios for CI2:CI3 and CI3:CI2 happen to be the same, and they exceed the thresholds described above. Accordingly, the dichotomy data 208 indicates that CI2:CI3 and CI3:CI2 dichotomies exist. The rectangular outline in the dichotomy data 208 of the example environment 200 indicates content item relationships for which a dichotomy exists.

In some implementations, the content management system 108 receives a request for content, e.g., from a user device as described above with reference to FIG. 1. In response to receiving the request, the content management system 108 may identify candidate content items that are responsive to the request. Candidate content items may be identified using any suitable means, such as the use of a relevance score to determine the relevance of candidate content items with respect to the resource with which the content items are to be presented.

Once candidates are identified, the content management system determines a score for each candidate content item, which includes adjusting scores for candidates based on stored dichotomy information, if any. For example, if three candidate content items are identified as responsive to a request, each may have a relevance score. If any of the candidate content items have an identified dichotomy, the relevance score for that content item may be adjusted. In some implementations, the score adjustment is based on a relative strength of the dichotomy. For example, if CI1 is a candidate content item, its score may be adjusted as a function of the dichotomy ratio—e.g., the score may be multiplied by 0.3.

In some situations, a user device specific dichotomy and a regular dichotomy may exist for one or more candidate content items. In these situations the user device specific dichotomy may be used to adjust scores for candidates instead of the regular dichotomy. In some implementations, a combination of the two dichotomies may be used. Any suitable method for combining dichotomies may be used to adjust scores, such as using a product of, or difference between, dichotomy ratios.

In some implementations, adjustment of scores depends on co-presentation of both content items of the dichotomy. In other words, the score for CI1 may only be adjusted based on the dichotomy data if a dichotomy exists between CI1 and another candidate content item—e.g., using the dichotomy data 208 of the example environment 200, CI1 would only have its score adjusted if CI2 were also a candidate content item.

The content management system selects one or more content items from the candidate content items based on at least in part on the scores, including the adjusted scores. The content management system provides the selected content item(s) responsive to the request.

By way of example, a user of a user device may search for a topic using a search engine. The search engine provides the user with a search result page resource, and the search result page may include two advertisement blocks, one on the top, and one on the right hand side, below the top advertisement block. Each advertisement block may include two advertisement slots—with a total of four advertisement slots. The user device renders the search result page and sends a content item request to a content management system. The content management system selects four advertisements using relevance scores for content items and stored dichotomy information. Once the content items are selected, the content management system provides the selected content items to the user device for display in the advertisement slots.

Figure 3:
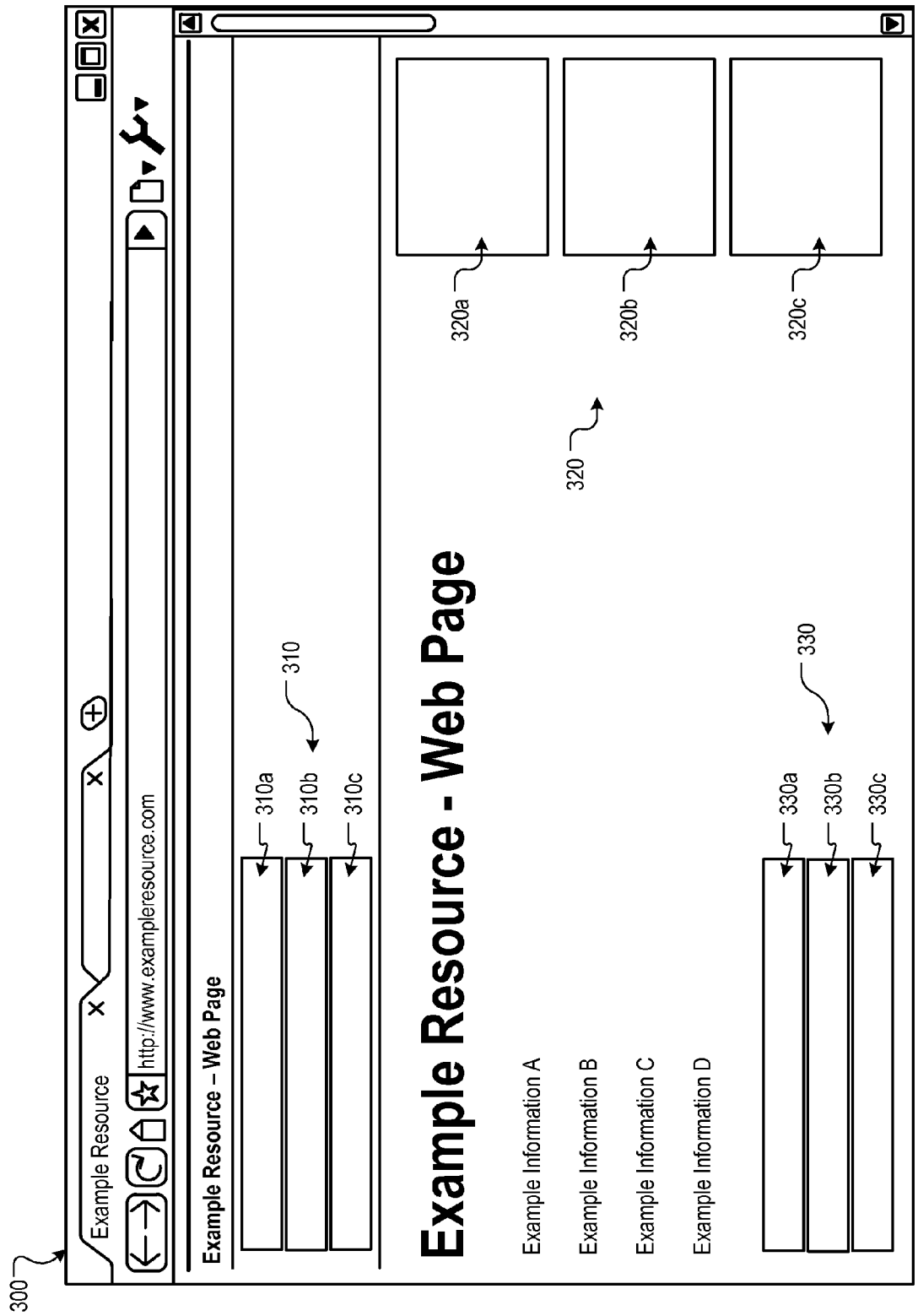
FIG. 3 is an illustration of an example resource including content slots.

FIG. 3 is an illustration of an example resource 300 including content slots (e.g., 310a-c, 320a-c, and 330a-c). The example resource 300 is a webpage that is shown rendered in a web browser of a user device. The resource includes three content blocks, 310, 320, and 330, that each include three content slots, 310a-c, 320a-c, and 330a-c, respectively. The user device rendering the resource 300 may send a content item request to the content management system in order to obtain content items for display in the content slots.

As discussed above with reference to FIG. 2, the position—e.g., the content block and content slot—in which content items are presented is used to determine dichotomies. For example, the content management system may consider the top-left area the most prominent. In the example resource 300, the content item in content slot 310a would be the most prominent, followed by 310b, 310c, 320a, and so on, until content slot 330c, which would be the lowest position.

In some implementations, co-presentation requires that content items be presented in the same content block. For example, content items displayed in slots 310a, 310b, and 310c would be considered co-presented, while content items presented in content blocks 320 or 330 would not be considered co-presented with the content items presented in content block 310. In some implementations, content items presented in one content block are also considered co-presented with content items presented in a different content block. For example, a content item presented in content slot 310a would be considered co-presented with a content item presented in content slot 320b.

Figure 4:
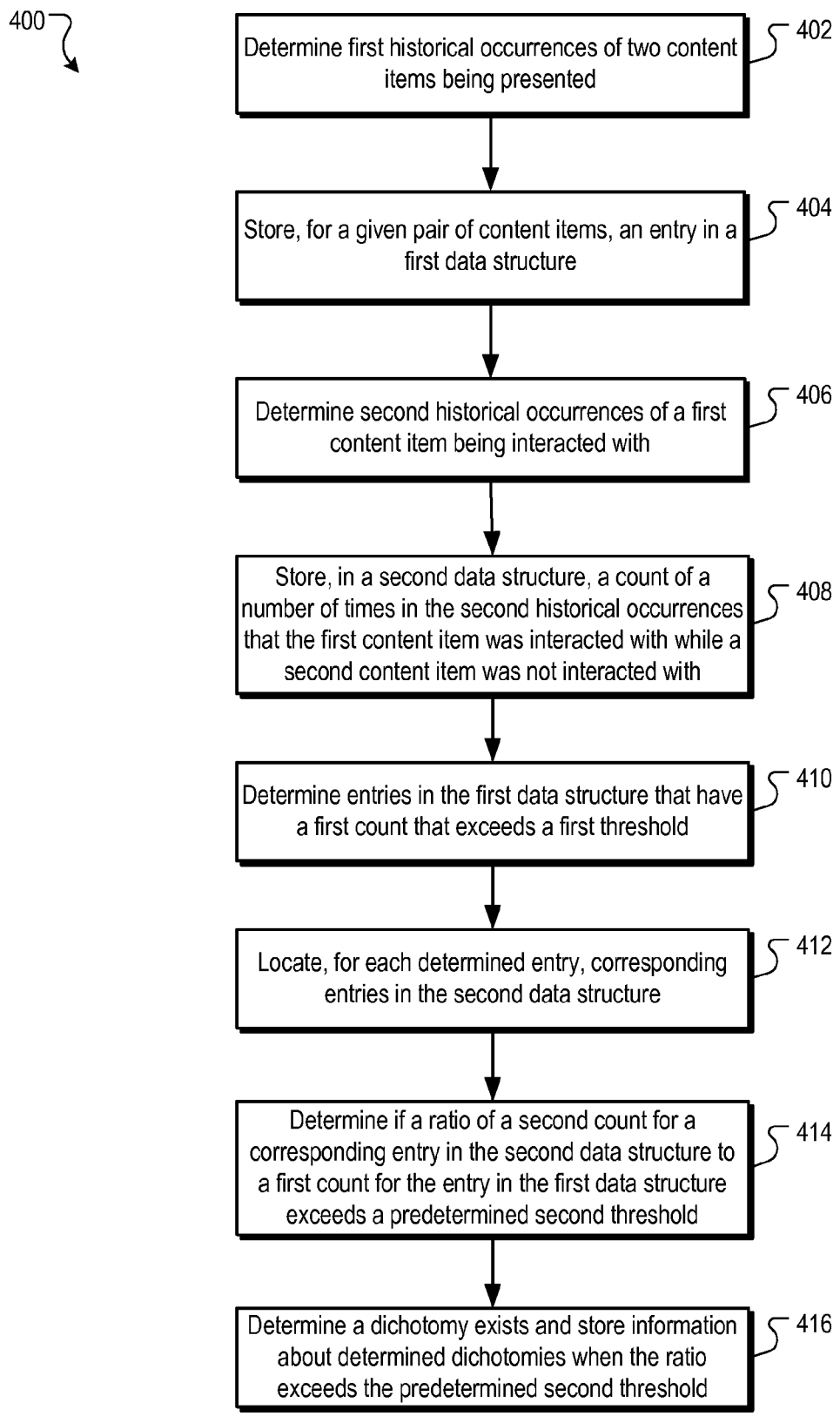
FIG. 4 is a flow diagram of an example process for determining content item relevance.

FIG. 4 is a flow diagram of an example process 400 for determining content item relevance. The process 400 may be implemented by a data processing apparatus, such as a content management system.

Historical occurrences of two content items being presented together in association with a single resource are determined (402). For example, the content management system 108 obtains historical data recorded in a content item data store. In particular, historical data relating to the co-presentation of a pair of content items is retrieved.

For a given pair of content items, an entry that indicates a count based on the first historical occurrences is stored in a first data structure (404). For example, the content management system 108 may store, in a matrix, an entry that indicates how many times a given pair of content items were co-presented in association with a single resource.

Historical occurrences (referred to hereafter as "second historical occurrences") of a first content item being interacted with when it was presented in a lesser position in a block of content items are determined (406). For example, the historical data obtained by the content management system indicates the positions of each content item co-presented with a resource. The content management system may use this data to determine a number of times that one content item was selected when it was not in the most prominent content slot.

For a given pair of content items including a first content item of the pair and second content item of the pair, a count of a number of times in the second historical occurrences that the first content item was interacted with while in a lesser position relative to the second content item in the pair while the second content item was not interacted with is stored in a second data structure (408). For example, the content management system stores, for the given pair of content items, the number of second historical occurrences for each content item of the pair. In this example, each entry indicates, for a particular content item of the pair, how many times the other content item of the pair was selected when the other content item was presented in a lesser position than the particular content item, and the particular content item was not selected.

Entries in the first data structure that have a first count that exceeds a first threshold are determined (410). For example a first threshold may be 200 occurrences. The content management system determines which of the entries exceed the threshold. A number of occurrences less than the threshold may not be enough for a reliable inference to be made, so the content management system may not use those occurrences for determining dichotomies.

For each determined entry, corresponding entries in the second data structure are located (412). For example, if the content management system determines that two content items have been co-presented a number of times greater than the first threshold, the content management system will locate entries in the second data structure that correspond to those content items.

Whether a ratio of a second count for a corresponding entry in the second data structure to a first count for the entry in the first data structure exceeds a predetermined second threshold is determined (414). For example, a second threshold may be 25:100, which may be expressed as a decimal (e.g., 0.25) or a percent (e.g., 25%). The content management system determines whether the ratio of second counts to first counts for a particular content item exceed the second threshold.

When the ratio exceeds the predetermined second threshold, it is determined that a dichotomy exists and information about the determined dichotomies is stored (416). For example, the ratio for a particular content item of a pair of content items may exceed the second threshold of 25%. This indicates that, for at least 25% of co-occurrences of the pair of content items, the particular content item was not selected when it was presented more prominently than a second content item of the pair that was selected. Thus, the content management system stores dichotomy data for the particular content item that indicates a dichotomy exists.

In some implementations, the content management system uses the stored dichotomy data to determine which content item(s) to serve in response to a content item request. For example, the content management system may receive a request for content, identify plural candidates responsive to the request, and determine a score for each candidate. The scores may be used to select which content item(s) to provide, and they may be adjusted if a dichotomy exists between a pair of content items that are eligible to be provided. The content management system may then provide the selected content item(s) responsive to the received request.

Figure 5:
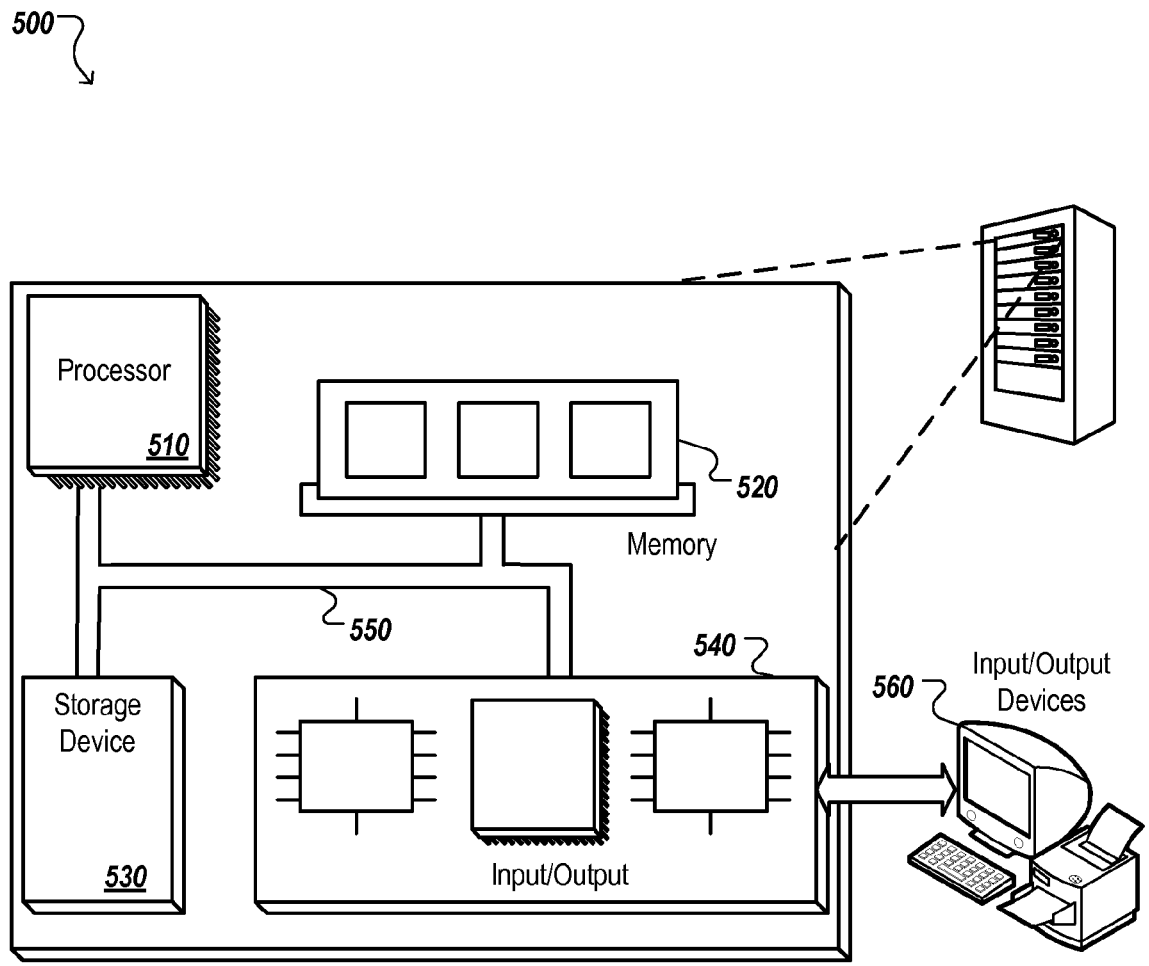
FIG. 5 is a block diagram of an example data processing apparatus.

FIG. 5 is a block diagram of an example data processing apparatus 500. The apparatus may be used to perform the operations described above. The apparatus 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the apparatus 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the apparatus 500. In one implementation, the storage device 530 is a computer-readable medium. In various different implementations, the storage device 530 can include, for example, a hard disk device, an optical disk device, a storage device that is shared over a network by multiple computing devices, e.g., a cloud storage device, or some other large capacity storage device.

The input/output device 540 provides input/output operations for the apparatus 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc. Although an example data processing apparatus has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    determining, by a computer device, a first collection of historical occurrences of one or more content item pairs being presented together in association with a single resource;
    storing, by the computer device, in a first data structure an entry that indicates a first count of the first collection of historical occurrences of the one or more content item pairs;
    determining, by the computer device and for each content item pair of the one or more content item pairs, a second collection of historical occurrences of a first content item of the content item pair being interacted with when it was presented in a lesser position in a block of content items, wherein the lesser position is not a first position in the block of content items;
    for the content item pair including the first content item of the content item pair and a second content item of the content item pair, storing, by the computer device, in a second data structure a second count of a number of times in the second collection of historical occurrences that the first content item was interacted with while in a less prominent position relative to the second content item of the content item pair while the second content item was not interacted with;
    determining, by the computer device, entries in the first data structure where the first count exceeds a first threshold;
    for each determined entry and by the computer device, locating a corresponding entry in the second data structure and determining if a ratio of the second count for the corresponding entry in the second data structure to the first count for the entry in the first data structure exceeds a predetermined second threshold; and
    when the ratio exceeds the predetermined second threshold, determining, by the computer device, that a dichotomy exists and storing information about the determined dichotomy in a data storage system.

2. The method of claim 1, wherein the one or more content item pairs are presented in response to a single request for content for presentation with the single resource.

3. The method of claim 1, wherein the one or more content item pairs are presented in a same ad block of the single resource.

4. The method of claim 1, wherein occurrences of the first content item being interacted with include occurrences of the first content item being clicked on.

5. The method of claim 1, wherein determining the first collection of historical occurrences includes evaluating a database that includes impression data for ads presented responsive to ad requests.

6. The method of claim 1, wherein determining the second collection of historical occurrences includes evaluating a database that includes click-through data after presentation of ads in an ad block.

7. The method of claim 1, further comprising using the information of the determined dichotomy to select content to deliver to an entity.

8. The method of claim 1, further comprising:
    receiving a request for content;
    identifying a plurality of candidate content items responsive to the request;
    determining a score for each candidate content item;
    adjusting scores for the plurality of candidate content items based on stored dichotomy information;

selecting a content item from the plurality of candidate content items based at least in part on the adjusted scores; and providing the selected content item responsive to the received request.

9. The method of claim 8, wherein determining a score for each candidate content item includes determining whether pairs of the plurality of candidate content items define a dichotomy based on the stored dichotomy information, and adjusting a score of at least one of the plurality of candidate content items based on a relative strength of the defined dichotomy.

10. The method of claim 9 wherein the relative strength is determined based on a ratio of second counts to first counts for a given pair.

11. A method performed by one or more data processing apparatus, the method comprising:

determining a first collection of historical occurrences of a pair of content items being presented together in association with one or more resources;

storing, in a first data structure, a first entry that indicates a first count of the first collection of historical occurrences;

determining a second collection of historical occurrences of a first content item of the pair of content items being interacted with when it was presented in a lesser position in a resource relative to a second content item of the pair of content items when the second content item was not interacted with;

storing, in a second data structure, a second entry that indicates a second count of the second collection of historical occurrences;

determining that the first entry in the first data structure meets a first threshold;

in response to the determination that the first entry in the first data structure meets the first threshold, determining that a ratio of the second count for the second entry in the second data structure to the first count for the first entry in the first data structure meets a second threshold; and in response to the determination that the ratio of the second count for the second entry in the second data structure to the first count for the first entry in the first data structure meets the second threshold, storing correlation data for the second content item in a data storage system, the correlation data being based on the ratio of the second count for the second entry in the second data structure to the first count for the first entry in the first data structure meets the second threshold.

12. A system comprising:

a data processing apparatus; and a data store storing instructions that, when executed by the data processing apparatus, cause the data processing apparatus to perform operations comprising:

determining a first collection of historical occurrences of one or more content item pairs being presented together in association with a single resource;

storing in a first data structure an entry that indicates a first count of the first collection of historical occurrences of the one or more content item pairs;

determining, for each content item pair of the one or more content item pairs, a second collection of historical occurrences of a first content item of the content item pair being interacted with when it was presented in a lesser position in a block of content items, wherein the lesser position is not a first position in the block of content items;

for the content item pair including the first content item of the given content item pair and a second content item of the content item pair, storing in a second data structure a second count of a number of times in the second collection of historical occurrences that the first content item was interacted with while in a less prominent position relative to the second content item of the content item pair while the second content item was not interacted with;

determining entries in the first data structure where the first count exceeds a first threshold;

for each determined entry, locating a corresponding entry in the second data structure and determining if a ratio of the second count for the corresponding entry in the second data structure to the first count for the entry in the first data structure exceeds a predetermined second threshold; and when the ratio exceeds the predetermined second threshold, determining that a dichotomy exists and storing information about the determined dichotomy in a data storage system.

13. The system of claim 12, wherein the one or more content item are presented in response to a single request for content for presentation with the single resource.

14. The system of claim 12, wherein determining the first collection of historical occurrences includes evaluating a database that includes impression data for ads presented responsive to ad requests.

15. The system of claim 12, wherein determining the second collection of historical occurrences includes evaluating a database that includes click-through data after presentation of ads in an ad block.

16. The system of claim 12, wherein the operations further comprise using the information of the determined dichotomy to select content to deliver to an entity.

17. The system of claim 12, wherein the operations further comprise:

receiving a request for content;

identifying a plurality of candidate content items responsive to the request;

determining a score for each candidate content item;

adjusting scores for the plurality of candidate content items based on stored dichotomy information;

selecting a content item from the plurality of candidate content items based at least in part on the adjusted scores; and providing the selected content item responsive to the received request.

18. The system of claim 17, wherein determining a score for each candidate includes determining whether pairs of the plurality of candidate content items define a dichotomy based on the stored dichotomy information, and adjusting a score of at least one of the plurality of candidate content items based on a relative strength of the defined dichotomy.

19. The system of claim 18 wherein the relative strength is determined based on a ratio of second counts to first counts for a given pair.

20. A computer readable medium storing instructions that, when executed by a data processing apparatus, cause the data processing apparatus to perform operations comprising:

determining a first collection of historical occurrences of one or more content item pairs being presented together in association with a single resource;

storing in a first data structure an entry that indicates a first count of the first collection of historical occurrences of the one or more content item pairs;

determining, for each content item pair of the one or more content item pairs, a second collection of historical occurrences of a first content item of the content item pair being interacted with when it was presented in a lesser position in a block of content items, wherein the lesser position is not a first position in the block of content items;

for the content item pair including the first content item of the content item pair and a second content item of the content item pair, storing in a second data structure a second count of a number of times in the second collection of historical occurrences that the first content item was interacted with while in a less prominent position relative to the second content item of the content item pair while the second content item was not interacted with;

determining entries in the first data structure where the first count exceeds a first threshold;

for each determined entry, locating corresponding entries in the second data structure and determining if a ratio of the second count for the corresponding entry in the second data structure to the first count for the entry in the first data structure exceeds a predetermined second threshold; and when the ratio exceeds the predetermined second threshold, determining that a dichotomy exists and storing information about the determined dichotomy in a data storage system.

\* \* \* \* \*